United States Patent
Lin

(10) Patent No.: US 7,945,153 B2
(45) Date of Patent: May 17, 2011

(54) FOCUS ADJUSTMENT MECHANISM AND PHOTO DEVICE HAVING THE SAME

(75) Inventor: Tzu-Chih Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 4 days.

(21) Appl. No.: 12/545,211

(22) Filed: Aug. 21, 2009

(65) Prior Publication Data

US 2010/0119220 A1    May 13, 2010

(30) Foreign Application Priority Data

Nov. 11, 2008  (TW) ................................ 97143521 A

(51) Int. Cl.
*G03B 13/34* (2006.01)
(52) U.S. Cl. ........................................ 396/131; 200/237
(58) Field of Classification Search .................... 396/93, 396/103, 131; 200/237
See application file for complete search history.

(56) References Cited

U.S. PATENT DOCUMENTS

| | | | | |
|---|---|---|---|---|
| 5,649,240 A | * | 7/1997 | Saegusa | 396/124 |
| 5,796,058 A | * | 8/1998 | Aimi et al. | 200/16 D |
| 6,646,211 B2 | * | 11/2003 | Taniuchi et al. | 200/4 |
| 6,680,676 B1 | * | 1/2004 | Hayashi et al. | 341/22 |
| 6,812,968 B1 | * | 11/2004 | Kermani | 348/345 |
| 7,636,122 B2 | * | 12/2009 | Matsui | 348/345 |
| 2004/0231114 A1 | * | 11/2004 | Iwase et al. | 24/424 |
| 2008/0165272 A1 | * | 7/2008 | Toguchi | 348/348 |

\* cited by examiner

*Primary Examiner* — Rochelle-Ann J Blackman
*Assistant Examiner* — Linda B Smith
(74) *Attorney, Agent, or Firm* — Alan Kamrath; Kamrath & Associates PA

(57) ABSTRACT

A focus adjustment mechanism is used for a photo device for adjusting a focus of a lens assembly of the photo device. The focus adjustment mechanism comprises a focus adjustment button connected to a casing of the photo device and comprising a contact portion, and a pressure detection module disposed in the photo device in a position corresponding to the focus adjustment button to contact the contact portion, and the pressure detection module is electrically coupled with the lens assembly. When the focus adjustment button is pressed, the pressure detection module can generate a signal value according to a displacement value of the focus adjustment button so that a focus of the lens assembly is determined according to each signal value. Furthermore, the present invention discloses a photo device having the focus adjustment mechanism.

8 Claims, 5 Drawing Sheets

FOCUS ADJUSTMENT MECHANISM AND PHOTO DEVICE HAVING THE SAME

BACKGROUND OF THE INVENTION

1. Field of the Invention

The present invention relates to a photo device and a focus adjustment mechanism.

2. Description of the Related Art

A photo device (e.g. a digital camera) having a focus adjustment mechanism has been available in the prior arts. A user can adjust a focus by pressing a focus adjustment button. For example, when the user presses a focus button, the lens assembly of a photo device will lengthen or shorten in a required manner to allow the user to focus the image.

The prior art focus adjustment mechanisms usually need two independently set focus adjustment buttons, disposed side by side, to carry out zooming operations. One is a zoom in button. Usually, when it is pressed, the lens assembly will extend outward, which magnifies the object displayed on the viewfinder (e.g. a screen). The other one is a zoom out button. Usually, when it is pressed, the lens assembly will shorten inward, which reduces the magnification of the object displayed on the viewfinder.

However, since a photo device usually has many function buttons, if only a single function of focus adjustment requires two focus adjustment buttons to operate, the room for other components of the photo device will be relatively small. Moreover, a higher number of function buttons increases the cost of the components.

In addition, in the prior arts, the user has to use two focus adjustment buttons together, so a user needs to remember the difference between the two. That is, the user needs to remember which one is the zoom in button and which one is the zoom out button, or the user will be confused and have difficulty using the photo device.

Therefore, it is desirable to provide a photo device and a focus adjustment mechanism to mitigate and/or obviate the aforementioned problems.

SUMMARY OF THE INVENTION

A primary object of the present invention is to provide a focus adjustment mechanism and a photo device having the same for adjusting the focus of a lens assembly of the photo device.

Another object is to provide a focus adjustment mechanism and a photo device having the same so as to simplify the required mechanism for adjusting the focus of the lens assembly of the photo device.

An additional object is to provide a focus adjustment mechanism and a photo device having the same so as to facilitate adjustment of the focus of the lens assembly of the photo device.

In order to achieve the above-mentioned objects and other objectives, the present invention provides a focus adjustment mechanism, used for a photo device, for adjusting the focus of a lens assembly of the photo device. The focus adjustment mechanism comprises: a focus adjustment button connected to a casing of the photo device and comprising a contact portion; and a pressure detection module disposed in the photo device in a position corresponding to the focus adjustment button to contact the contact portion, with the pressure detection module being electrically coupled with the lens assembly. When the focus adjustment button is pressed, the pressure detection module can output a signal value according to a displacement value of the focus adjustment button, such that a focus of the lens assembly is determined according to each signal value.

The present invention also provides a photo device comprising: a casing; a zoom lens assembly; a focus adjustment button connected to the casing and comprising a contact portion; and a pressure detection module disposed in the photo device in a position corresponding to the focus adjustment button to contact the contact portion. The pressure detection module is electrically coupled with the lens assembly. When the focus adjustment button is pressed, the pressure detection module can output a signal value according to a displacement value of the focus adjustment button, such that a focus of the lens assembly is determined according to each signal value.

According to one embodiment of the invention, the pressure detection module comprises a casing, an action element, an elastic electric member, a resistance member, and a conductive member. The outside bottom surface of the casing is fixed to the electronic device, and the outside top surface of the casing is close to the contact portion of the focus adjustment button and has a hole. The action element comprises a slab with a side removably received in the casing. A protrusion, which is located on the top surface of the slab, passes through the hole to be against the contact portion of the focus adjustment button. The elastic electric member comprises a fringe rod connected to the slab, and a rebounding portion, which is formed by bending the end of the fringe rod, is against the inside bottom surface of the casing. The resistance member is disposed within a side of the casing and touches the fringe rod of the elastic electric member. When the protrusion is pressed to make the slab descend, which produces a position of the resistance member being touched by the fringe rod, the resistance member performs a corresponding resistance value in association with the movement of the slab. The conductive member is disposed within a side of the casing different from the side where the resistance member is located and touches the fringe rod of the elastic electric member.

DETAILED DESCRIPTION OF THE PREFERRED EMBODIMENT

The advantages and innovative features of the invention will become more apparent from the following detailed description when taken in conjunction with the accompanying drawings.

Figure 1:
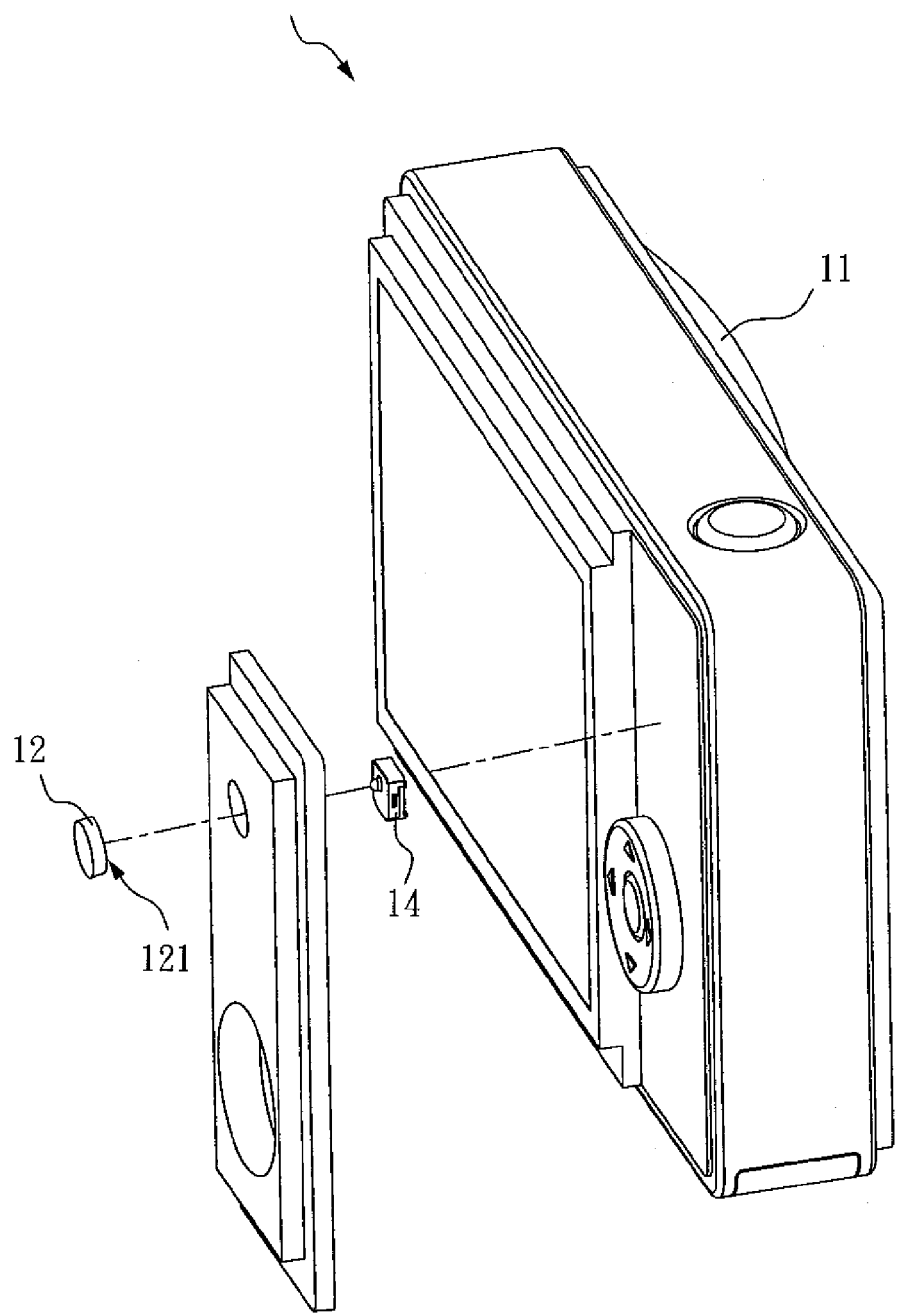
FIG. 1 is a schematic exploded view of a photo device of the present invention.
Figure 2:
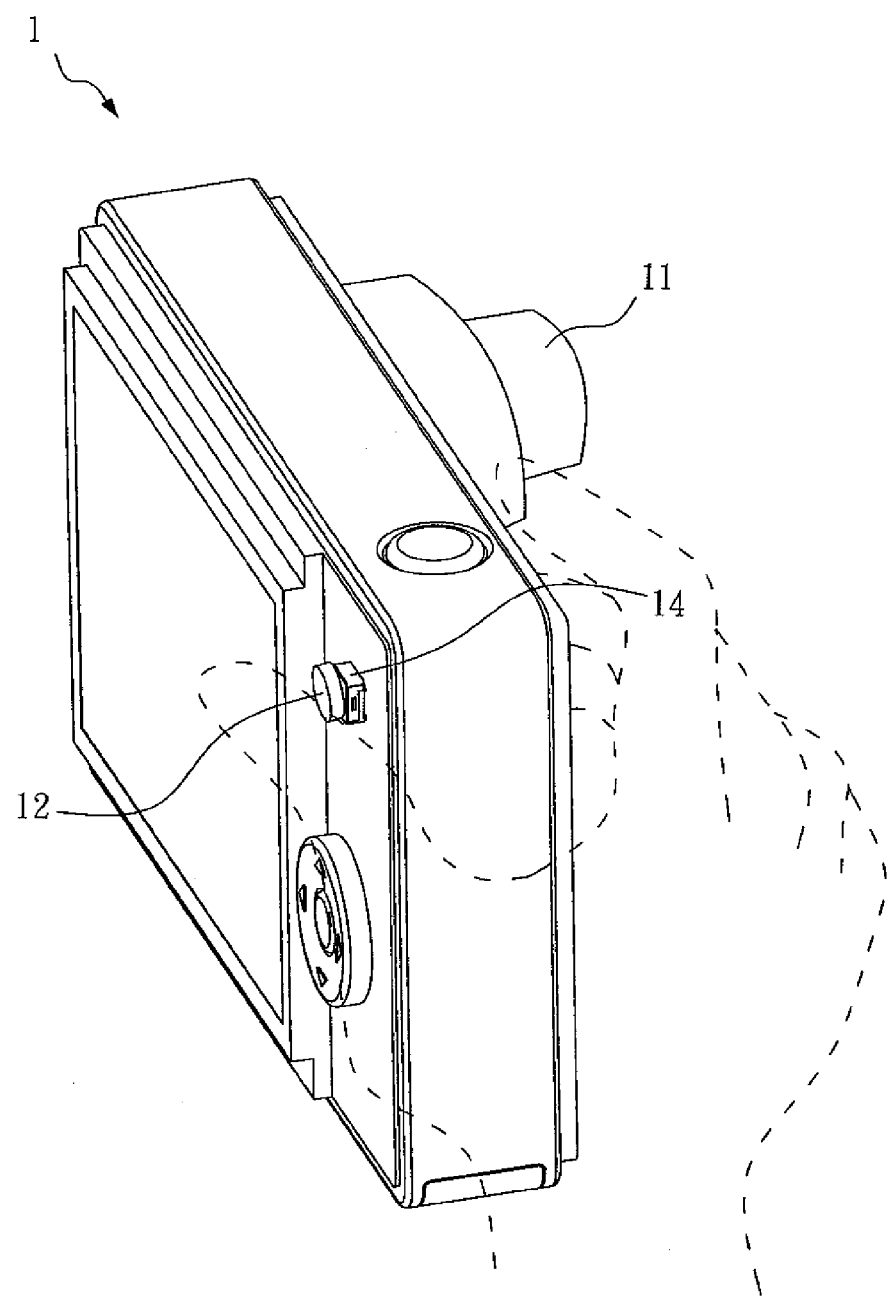
FIG. 2 is a schematic drawing of a focus adjustment mechanism of the present invention when a focus adjustment button is pressed.

Please refer to FIG. 1 and FIG. 2. FIG. 1 is a schematic exploded view of a photo device of the present invention. FIG. 2 is a schematic drawing of a focus adjustment mechanism of the present invention when the focus adjustment button is pressed. A photo device 1 comprises a focus adjustment mechanism. The focus adjustment mechanism is used for adjusting the focus of a lens assembly 11 of the photo device 1. For example, when the optical zoom mode of the photo device 1 is used, the focus adjustment mechanism enables the lens assembly 11 to lengthen or shorten to allow a user to focus the image.

In this embodiment, the photo device 1 is a digital camera, but it can also be other devices having a photo device with a focus adjustment mechanism, such as a camera cell phone or a PDA.

As shown in FIG. 1, the focus adjustment mechanism mainly comprises a focus adjustment button 12 and a pressure detection module 14. The focus adjustment button 12 is connected to a casing of the photo device 1. The focus adjustment button 12 comprises a contact portion 121. The pressure detection module 14 is disposed in the photo device 1 in a position corresponding to the focus adjustment button 12 to contact the contact portion 121, and the pressure detection module 14 is electrically coupled with the lens assembly 11. When the user presses the focus adjustment button 12, a displacement value of the focus adjustment button 12 is generated by the pressure. The pressure detection module 14 can generate a signal value according to the displacement value of the focus adjustment button 12 when pressed. In this embodiment, the signal value is a resistance value. A focus of the lens assembly 11 of the photo device 1 is determined according to each resistance value. When the user presses the focus adjustment button 12, a displacement value of the focus adjustment button 12 is generated by the pressure. The pressure detection module 14 can generate a signal value according to the displacement value of the focus adjustment button when pressed. In this embodiment, the signal value is a resistance value. A focus of the lens assembly 11 of the photo device 1 is determined according to each resistance value.

The displacement value of the focus adjustment button 12 correlates with the pressure acting on it, and there is a particular focus of the photo device 1 corresponding to each displacement value. That is to say, when the force exerted on the focus adjustment button 12 by the user is greater, the displacement value of the focus adjustment button 12 is larger. When the force exerted on the focus adjustment button 12 by the user is smaller, the displacement value of the focus adjustment button 12 is smaller. The force exerted on the focus adjustment button 12 can be in direct proportion to the displacement value, but this proportion is not intended to limit the present invention.

Figure 5:
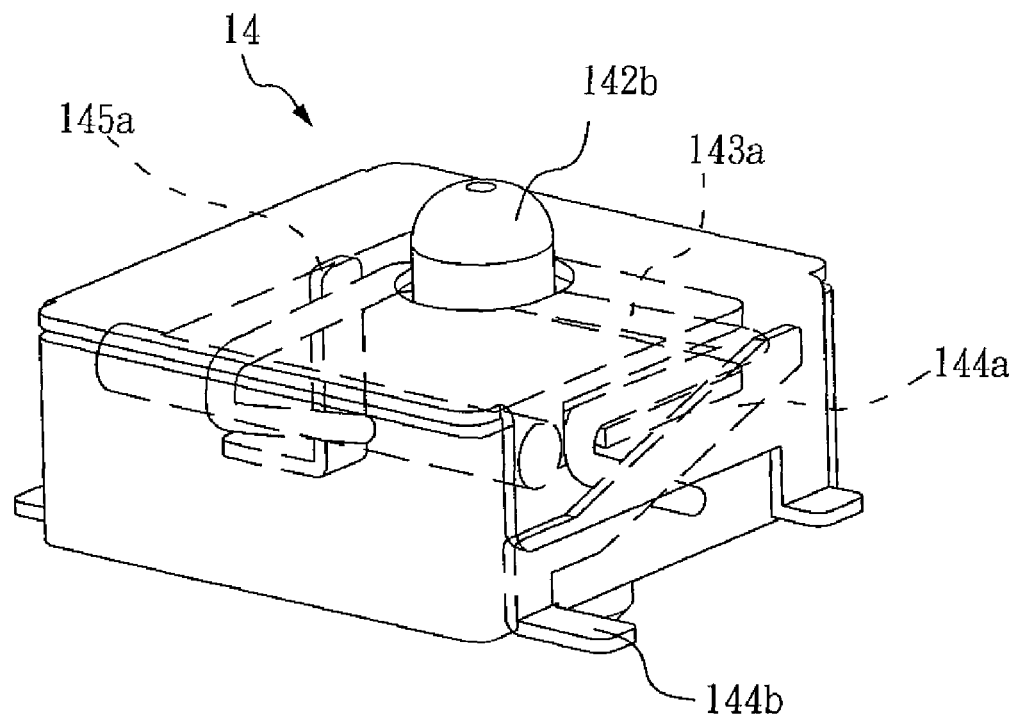
FIG. 5 is a schematic drawing of the pressure detection module when an action element is not pressed.
Figure 6:
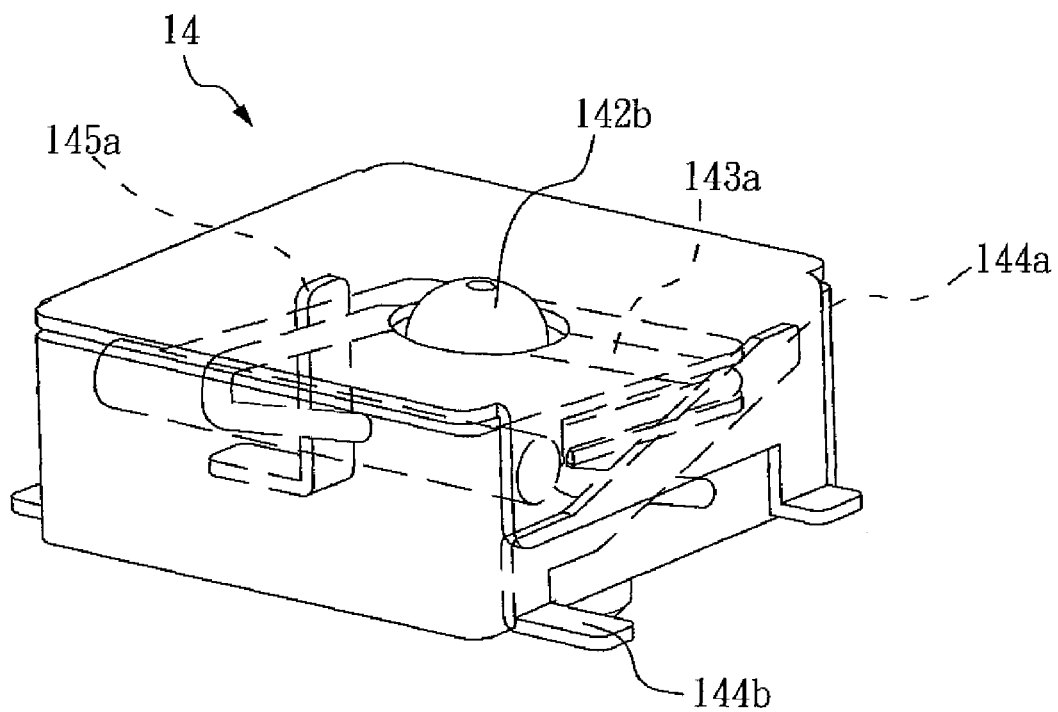
FIG. 6 is a schematic drawing of the pressure detection module when an action element is pressed.

The pressure detection module 14 is located inside the focus adjustment button 12, and a protrusion 142b of the pressure detection module 14 directly contacts the contact portion 121 of the focus adjustment button 12. When the user does not exert force on the focus adjustment button 12 (as shown in FIG. 1 and FIG. 5), the protrusion 142b is more protrudent, and, thus, the focus adjustment button 12 is also more protrudent. When the user exerts force on the focus adjustment button 12 (as shown in FIG. 2 and FIG. 6), the focus adjustment button 12 will move toward the pressure detection module 14. When the focus adjustment button 12 is pressed, the protrusion 142b is also pressed. The displacement value of the focus adjustment button 12 caused by the pressure is the same as the displacement value of the protrusion 142b.

Figure 3:
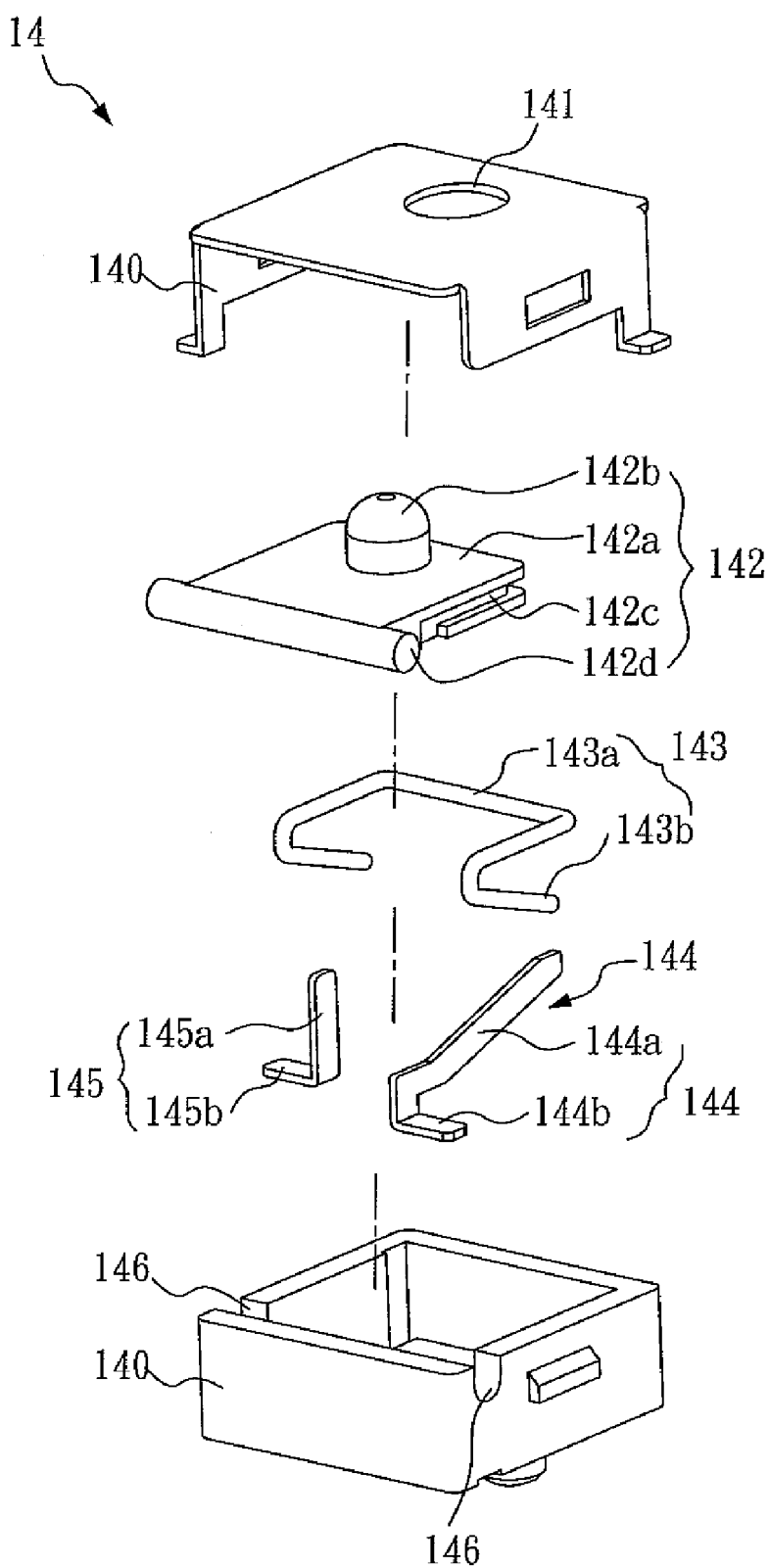
FIG. 3 is an exploded view of a pressure detection module.
Figure 4:
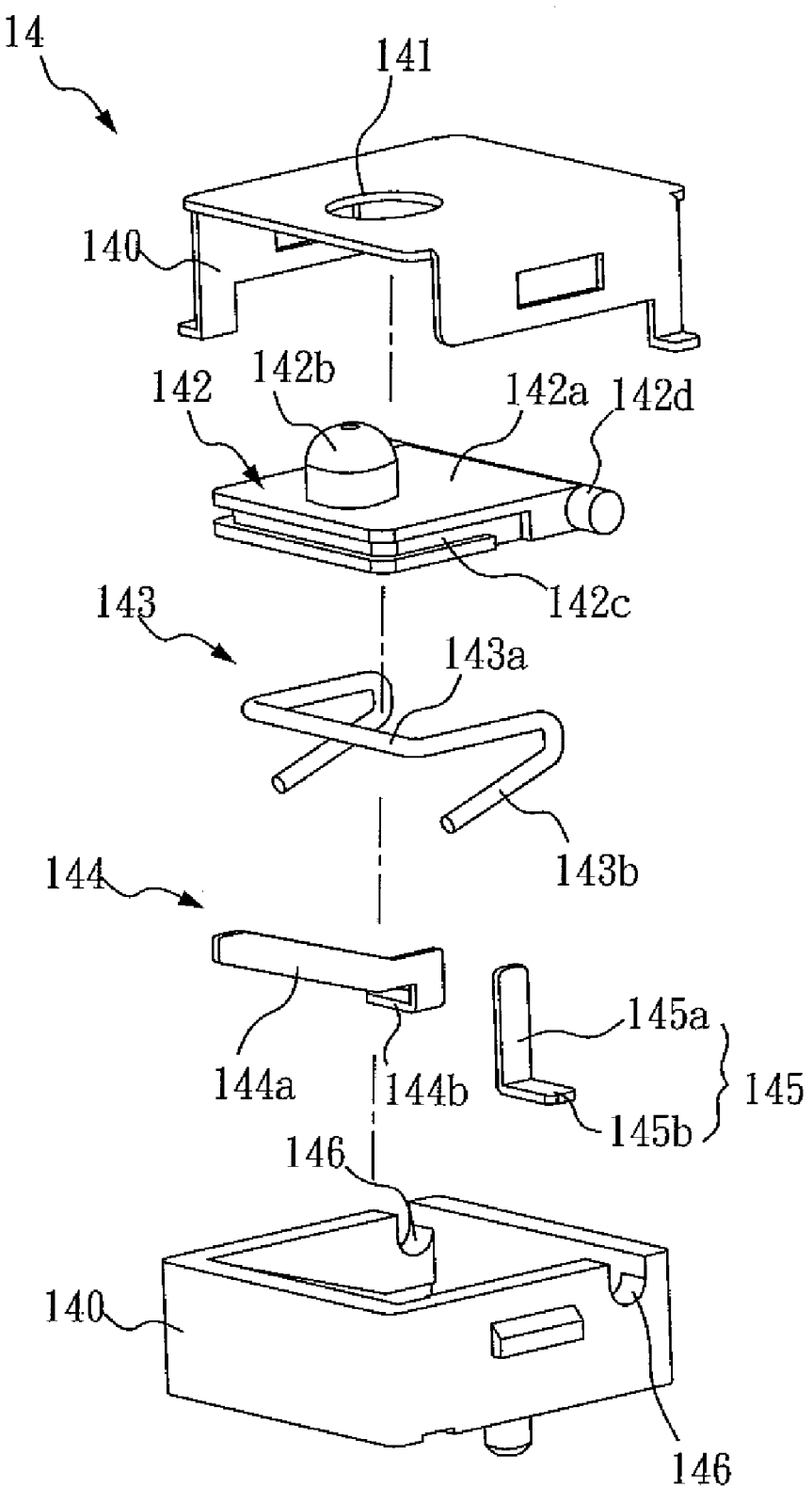
FIG. 4 is an exploded view of the pressure detection module from another angle.

The following illustrates the structure of the pressure detection module 14 of this embodiment. Please refer to FIG. 3 and FIG. 4. FIG. 3 is an exploded view of the pressure detection module 14. FIG. 4 is an exploded view of the pressure detection module 14 from another angle. The pressure detection module 14 comprises a casing 140, an action element 142, an elastic electric member 143, a resistance member 144, and a conductive member 145. The action element 142, the elastic electric member 143, the resistance member 144, and the conductive member 145 are placed in the casing 140. The outside bottom surface of the casing 140 is fixed to an electronic device. The outside top surface of the casing 140 is close to the contact portion 121 of the focus adjustment button 12 and has a hole 141.

The action element 142 can move downward a certain distance when force acts upon it. When the focus adjustment button 12 is pressed, the contact portion 121 of the focus adjustment button 12 maintains contact with the protrusion 142b of the pressure detection module 14 with different amounts of force. In this embodiment, the action element 142 comprises a slab 142a with a side removably received in the casing 140. The protrusion 142b, which is located on the top surface of the slab 142a, passes through a hole 141 to be against the contact portion 121 of the focus adjustment button 12. The protrusion 142b directly contacts the contact portion 121 of the focus adjustment button 12. When the focus adjustment button 12 is rotated, which causes the contact portion 121 to move downward, the protrusion 142b is also pressed. The force acting upon the protrusion 142b is directly passed to the elastic electric member 143 connected with the protrusion 142b.

In order to allow the protrusion 142b to be pressed, in this embodiment, the action element 142 has a shaft 142d on a side, and the casing 140 has shaft holders 146 formed on its two sides opposite to each other. The shape and position of the shaft 142d and that of the shaft holders 146 match up so as to enable the two ends of the shaft 142d to pivot the shaft holders 146 respectively. Therefore, when the protrusion 142b is pressed, the action element 142 can pivot the shaft 142d.

The elastic electric member 143 is connected with the action element 142. The elastic electric member 143 comprises a fringe rod 143a connected to the slab 142a. A rebounding portion 143b, which is formed by bending the end of the fringe rod 143a, is against the inside bottom surface of the casing 140. When the protrusion 142b is pressed, the elastic electric member 143 is compressed. When the protrusion 142b is not pressed, the elastic electric member 143 will return to its original state. In this embodiment, a joint groove 142c is formed on three lateral surfaces of the action element for connecting the elastic electric member 143 with the action element 142. The fringe rod 143a of the elastic electric member 143 is a U-shaped metal rod that infixes the joint groove 142c. It should be noted that the form of the connection between the elastic electric member 143 and the action element 142 of the present invention is not limited by this description.

The resistance member 144 is disposed within a side of the casing 140 and contacts the fringe rod 143a of the elastic electric member 143. When the protrusion 142b is pressed to make the slab 142a descend, which produces a position of the resistance member 144 being touched by the fringe rod 143a, the resistance member 144 perform a corresponding resistance value in association with the movement of the slab 142a.

In this embodiment, the resistance member 144 comprises a metal board 144a located on the inside surface of the casing 140 at an angle. A conductive leg 144b which is formed by bending the end of the metal board 144a passes through the casing 140. The purpose of the oblique resistance member 144 is to increase the length of the resistance member 144 so as to increase the range of movement of the elastic electric member 143 along the resistance member 144, which can reduce the occurrence of errors in the resistance value of the resistance member 144.

The conductive member 145 is disposed within a side of the casing 140 different from the side on which the resistance member 144 is located. The conductive member 145 contacts the fringe rod 143a of the elastic electric member 143 such that the conductive member 145, the elastic electric member 143, and the resistance member 144 are electrically conductive. In this embodiment, the conductive member 145 comprises a metal board 145a located on the inside surface of the casing 140 perpendicularly. A conductive leg 145b, that is formed by bending the end of the metal board 145; passes through the casing 140.

Next, please refer to FIG. 1, FIG. 2, FIG. 5, and FIG. 6 for illustration of the operation of the pressure detection module 14. FIG. 5 is a schematic drawing of the pressure detection module 14 when the action element 142 is not pressed. FIG. 6 is a schematic drawing of the pressure detection module 14 when the action element 142 is pressed.

Please refer to FIG. 1 and FIG. 5. When the focus adjustment button 12 is not pressed, the fringe rod 143a of the elastic electric member 143 contacts the upper portion of the resistance member 144. This allows electrical signals to flow through a longer path along the resistance member 144, thereby generating a larger resistance value.

Please refer to FIG. 2 and FIG. 6. When the focus adjustment button 12 is pressed, the contact position between the fringe rod 143a of the elastic electric member 143 and the resistance member 144 differs. More specifically, the fringe rod 143a of the elastic electric member 143 contacts the lower portion of the resistance member 144. This allows electrical signals to flow through a shorter path along the resistance member 144, thereby generating a smaller resistance value.

In this embodiment, when the optical zoom mode of the photo device 1 is used and when the user presses the focus adjustment button 12 gradually, the lens assembly 11 gradually extends outward at the same time (as shown in FIG. 2). When the user loses contact with the focus adjustment button 12 gradually, the lens assembly 11 gradually shortens inward due to the elastic force of the elastic electric member 143 of the pressure detection module 14. Thus, the direction of pressure on the focus adjustment button 12 caused by the user is the same as the direction in which the lens assembly 11 lengthens and shortens. This provides intuitive operation and improved facility of use.

Therefore, as long as the difference in resistance values of the protrusion 142b of the pressure detection module 14 between the larger and the smaller displacement values due to pressure is obtained, the obtained difference is divided into certain levels, and the displacement value caused by pressure on the focus adjustment button 12 can be converted into a particular focus value.

It should be noted that the force exerted on the focus adjustment button 12 by the user, the displacement value of the focus adjustment button 12, the resistance value of the resistance member 144, and the focus of the photo device 1 should be set for values that can operate in coordination.

Compared with prior art devices that use two focus adjustment buttons (a zoom in button and a zoom out button), the photo device 1 and focus adjustment mechanism of the present invention uses only one focus adjustment button 12, so it has simpler structure and is space-saving. In addition, the user can adjust the focus of the lens assembly intuitively. That is, the pressing direction of the focus adjustment button 12 is the same as the direction in which the lens assembly 11 lengthens and shortens. This provides improved facility of use.

It is noted that the above-mentioned embodiments are only for illustration. It is intended that the present description cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A focus adjustment mechanism used for a photo device with a casing, for adjusting a focus of a lens assembly of the photo device, the focus adjustment mechanism comprising:
   a focus adjustment button connected to the casing of the photo device, with the focus adjustment button comprising a contact portion; and
   a pressure detection module disposed in the photo device in a position corresponding to the focus adjustment button to contact the contact portion, with the pressure detection module electrically coupled with the lens assembly;
   wherein the pressure detection module comprises:
   a casing, wherein an outside bottom surface of the casing is fixed to the photo device and an outside top surface of the casing is close to the contact portion of the focus adjustment button and has a hole;
   an action element comprising a slab with a side removably received in the casing and a protrusion, which is located on a top surface of the slab, passes through the hole of the casing to be against the contact portion of the focus adjustment button, wherein a joint groove is formed on three lateral surfaces of the action element;
   an elastic electric member comprising a fringe rod connected to the slab, and a rebounding portion which is formed by bending the end of the fringe rod and is against the inside bottom surface of the casing, wherein the fringe rod of the elastic electric member is a U-shaped metal rod that infixes the joint groove;
   a resistance member disposed within a side of the casing and touching the fringe rod of the elastic electric member; wherein when the protrusion is pressed to make the slab descend produces a position of the resistance member being touched by the fringe rod, so as to make the resistance member perform a corresponding resistance value in association with the movement of the slab; and
   a conductive member disposed within a side of the casing different from the side where the resistance member is located and touching the fringe rod of the elastic electric member; wherein when the focus adjustment button is pressed, the pressure detection module outputs a signal value according to a displacement value of the focus adjustment button by being pressed so that the focus of the lens assembly is determined according to each signal value.

2. The focus adjustment mechanism as claimed in claim 1, wherein the action element has a shaft on a side, and the casing has shaft holders formed on two sides of the casing opposite to each other, wherein the two ends of the shaft pivot the shaft holders respectively.

3. The focus adjustment mechanism as claimed in claim 1, wherein the resistance member comprises a metal board located on the inside surface of the casing at an angle, and a conductive leg which is formed by bending the end of the metal board and which passes through the casing.

4. The focus adjustment mechanism as claimed in claim 1, wherein the conductive member comprises a metal board located on the inside surface of the casing perpendicularly, and a conductive leg which is formed by bending the end of the metal board and which passes through the casing.

5. An electronic device having a photographing function comprising:

a casing;

a zoom lens assembly with a focus;

a focus adjustment button connected to the casing, with the focus adjustment button comprising a contact portion; and a pressure detection module disposed in a position corresponding to the focus adjustment button to contact the contact portion, with the pressure detection module electrically coupled with the lens assembly, wherein the pressure detection module comprises:

a casing, wherein an outside bottom surface of the casing is fixed to the electronic device and an outside top surface of the casing is close to the contact portion of the focus adjustment button and has a hole;

an action element comprising a slab with a side removably received in the casing and a protrusion, which is located on a top surface of the slab, passes through the hole of the casing to be against the contact portion of the focus adjustment button, wherein a joint groove is formed on three lateral surfaces of the action element;

an elastic electric member comprising a fringe rod connected to the slab, and a rebounding portion which is formed by bending the end of the fringe rod and is against the inside bottom surface of the casing, wherein the fringe rod of the elastic electric member is a U-shaped metal rod that infixes the joint groove;

a resistance member disposed within a side of the casing and touching the fringe rod of the elastic electric member; wherein when the protrusion is pressed to make the slab descend produces a position of the resistance member being touched by the fringe rod, so as to make the resistance member perform a corresponding resistance value in association with the movement of the slab; and a conductive member disposed within a side of the casing different from the side where the resistance member is located and touching the fringe rod of the elastic electric member; wherein when the focus adjustment button is pressed, the pressure detection module outputs a signal value according to a displacement value of the focus adjustment button by being pressed so that the focus of the lens assembly is determined according to each signal value.

6. The electronic device having a photographing function as claimed in claim 5, wherein the resistance member comprises a metal board located on the inside surface of the casing at an angle, and a conductive leg which is formed by bending the end of the metal board and which passes through the casing.

7. The electronic device having a photographing function as claimed in claim 5, wherein the conductive member comprises a metal board located on the inside surface of the casing perpendicularly, and a conductive leg which is formed by bending the end of the metal board and which passes through the casing.

8. The electronic device having a photographing function as claimed in claim 5, wherein the action element has a shaft on a side, and the casing has shaft holders formed on two sides of the casing opposite to each other, wherein the two ends of the shaft pivot the shaft holders respectively.

* * * * *